United States Patent [19]

Price et al.

[11] Patent Number: 5,393,906

[45] Date of Patent: Feb. 28, 1995

[54] HIGH-STABILITY NON-LAURIC TRIGLYCERIDE OILS

[75] Inventors: Mark A. Price, Bergen; Nico Zwikstra, Heemstede, both of Netherlands

[73] Assignee: Van Den Bergh Foods Co., Division of Conopco Inc., Lisle, Ill.

[21] Appl. No.: 200,557

[22] Filed: Feb. 22, 1994

Related U.S. Application Data

[63] Continuation of Ser. No. 849,725, Mar. 10, 1992, abandoned.

[30] Foreign Application Priority Data

Mar. 11, 1991 [EP] European Pat. Off. ............ 91200516

[51] Int. Cl.⁶ .............................................. C07C 55/22
[52] U.S. Cl. .................... 554/227; 426/601; 426/602; 426/607
[58] Field of Search ............... 554/175, 227; 426/601, 426/602, 607

[56] References Cited

U.S. PATENT DOCUMENTS

| | | | |
|---|---|---|---|
| 3,450,727 | 6/1969 | Going et al. | 260/428.5 |
| 4,748,041 | 5/1988 | Player et al. | 426/601 |
| 4,753,812 | 6/1988 | Wilson et al. | 426/250 |
| 4,960,544 | 10/1990 | Van Putte et al. | 260/420 |

FOREIGN PATENT DOCUMENTS 0464881  1/1992  European Pat. Off. .
867615  5/1961  United Kingdom .

OTHER PUBLICATIONS

European Search report.
Abstract of JP 55069696, 1980.
Durkex 100® Product Brochure, SCM Corporation 1989.
Durkex 500® Product Brochure, SCM Corporation 1988.
Abstract of J55052388-A, 1980.
Abstract of JO2214-799-A 1989.
Abstract of JP 2 207 764, 1990.
Abstract of JP 61 173 743, 1986.

*Primary Examiner*—José G. Dees
*Assistant Examiner*—Deborah D. Carr
*Attorney, Agent, or Firm*—Cushman Darby & Cushman

[57] ABSTRACT

The invention concerns high-stability oils comprising vegetable, non-lauric triglycerides that are liquid above 10° C. and that display RIP values at 120° C. of at least 35 hours.

The N-profile of the oils displays the following characteristics: $N_{15}<10$; $N_{10}<15$ and $N_0<20$.

15 Claims, No Drawings

HIGH-STABILITY NON-LAURIC TRIGLYCERIDE OILS

This is a continuation of application No. 07/849,725, filed on Mar. 10, 1992, now abandoned.

BACKGROUND OF THE INVENTION

A frying oil having a high heat stability is known from JP 2 214 799-A. According to this Japanese document, the oil has a low increase in acid value and a low degradation in colour and taste when heated.

The oil is obtained by purifying crude palm oil to provide purified palm oil, fractionating the oil and treating the intermediate fraction with alkali. The IV of the intermediate fraction is 29–46. The treatment with alkali (2–20% NaOH in amounts of 1–5 wt.% at 40–95° C.) is followed by a water wash and a filtering step (activated clay) and finally by a steam deodorization.

Although the properties of this product are acceptable, it does not meet the very high standards for a high-stability oil (=HSO). An HSO should display a RIP (=Rancimat Induction Period) of at least 35 hours (at 120° C.), measured according to the method described in Fette, Seifen und Anstrichmittel, 88, Nr. 2, 1986, pp. 53–56.

Although triglyceride compositions (e.g. Durkex-500®, cf. US Pat. No. 4,748,041) are known that display RIP values of about 35 hours (at 120° C.) (i.e. AOM values of about 350, cf. column 4, lines 5–6), these triglycerides still contain appreciable amounts of solids at ambient temperatures ($N_{10} = 20$, $N_{20} < 10$). The iodine value of these oils is at most 81. These triglycerides therefore have the disadvantage that they are not pumpable and/or sprayable at ambient temperatures. Moreover, the colour and colour stability of these oils are not optimal.

A fraction of Durkex-500 (=Durkex-HSO ®) is also mentioned in this patent. This fraction has an I.V. of 80; however, an emulsifier needs to be added in order to make a filtered product cloudless at 10° C. (cf. column 5, lines 1–18).

From JP-55 069 696-A another highly stable fat is known that can be used for frying and spraying. This product is obtained from hardened palm oil. The fat has a high content of trans-acids and displays an AOM value of more than 200 (so, RIP of about 20–25). It is not clear what the solid fat indexes of this fat are at ambient temperature, but, considering the high amounts of trans-acids, they are expected to be rather high.

From GB 867,615 improved soft oils (see page 8) are known that display AOM values of at least 200 hours. According to the Table on page, a maximum AOM of 288 hours can be achieved, which is too low for a high-quality HSO. The reason for such an AOM value is probably that too high amounts of $C_{18:2}$ are present in the oils.

SUMMARY OF THE INVENTION

We have now found new high-stability oils that combine an excellent RIP stability with an excellent colour stability. In addition, the oils are essentially liquid at ambient temperatures.

Therefore, the invention concerns in the first place a high-stability oil (HSO) comprising a vegetable, non-lauric triglyceride composition with a maximum amount of $C_{18:3}$ fatty acids of 1 wt.%, preferably less than 0.5, and particularly preferably less than 0.05 wt. %, a maximum amount of $C_{18:2}$ fatty acids of 10 wt. %, preferably less than 8 wt.% and particularly preferably less than 5 wt.%, while the oil contains very small amounts of Fe, Cu and Ni, in particular not more than 0.2 ppm, and more preferably less than 0.1 ppm Fe, not more than 0.04 ppm, and more preferably less than 0.02 ppm Cu and not more than 0.2 ppm, and more preferably less than 0.1 ppm Ni; in the oil some amounts of natural tocopherols, in general at least 500 ppm, preferably at least 1000 ppm, are present. The HSO is liquid above 10° C. having a solids line (NMR, not stabilized) of $N_{15} < 10$, $N_{10} < 15$, preferably $<5.0$ and $N_O < 20$, preferably $<15.0$ and in particular $N_{10} < 0.5$ and $N_O < 5$. These oils display RIP values at 120° C. of at least 35 hours, preferably at least 40 hours, and have iodine values (I.V.) of at least 81, preferably 82–95.

The oils are very colour- and taste-stable. The colour change of the oils during storage at room temperature for 12 months is typically less than 0.1 Red in lov. 5¼″ cell, whereas the taste typically remains unchanged even after storage at room temperature for 6 months.

DETAILED DESCRIPTION OF THE INVENTION

The oils can be obtained as the olein fraction of either a wet fractionation or a dry fractionation process, followed by standard refining.

An oil having very good properties is obtained when a hardened mixture of soybean oil and cottonseed oil (weight ratios of both at least 1.0 and less than 1.0 are applicable) is fractionated, preferably wet-fractionated. The olein fraction is recovered and is subjected to a dry fractionation or a wet fractionation. After refining, using conventional methods, the olein fraction of this last-mentioned fractionation is an HSO having the properties defined above.

Other examples of suitable HSO's are the refined olein fractions of the fractionation of hardened soybean oil, hardened rapeseed oil or mixtures thereof.

In fact, more olein fractions of the fractionation of hardened vegetable oils or mixtures of vegetable oils are useful as long as they meet the requirements of the HSO as defined above.

One of the main advantages of the invention is that, during the wet or dry fractionation, the natural antioxidants, in particular the tocopherols, are concentrated in the olein fraction so that no addition of synthetic or isolated natural antioxidants is necessary. This is particularly the case in wet fractionation. We therefore prefer to use this fractionation method. However, addition of an extra amount of antioxidants, such as tocopherols, e.g. up to 1500 ppm, can have advantages, in particular when very high RIP values are required.

The oils according to the invention can be used for many purposes. As a result, use can be made of the advantageous properties of the HSO's, i.e. their moisture-barrier characteristics, their lubricating and anti-sticking properties. The main advantage of the use of these oils is that they can be pumped to and/or sprayed by the nozzles of an apparatus without the need to heat the oil. In this way, the oils can be used for coating or enrobing of food products, like raisins, for dipping of food products, in tumblers, wherein the food is tumbled in the presence of a sprayed oil, for pan-coating of moulds for food processing, etc. The oils can also be applied to the surface of foods, such as dehydrated foods, breakfast cereals, dry soups, protein concentrates or hydrolysates, meats, frozen foods, pastries, pies, biscuits, snacks, confectioneries or mixtures thereof to reduce sticking or the transmission of moisture into or out of these foods.

Other applications of the oils are: a solvent for food flavours or colours, or as release agent for the surface of equipment for food purposes.

The invention will now be illustrated by the following nonlimiting Examples.

EXAMPLE I

Soybean oil was hardened to a melting point of 32° C. The hardened soybean oil of 32° C. was wet-fractionated with acetone (ratio: 6 l acetone per kg oil). The fractionation was performed at −3° C. After separation of the stearin fraction and removal of the acetone, a liquid olein fraction was obtained in a yield of 60%, displaying the following characteristics (after standard refining):

| | |
|---|---|
| Amount of $C_{18:3}$ | <0.1 wt. % |
| Amount of $C_{18:2}$ | 7.9 wt. % |
| Fe | 0.1 ppm |
| Cu | 0.01 ppm |
| Ni | 0.01 ppm |
| Tocopherols | 593 ppm |
| RIP (120° C.) | 35.5 hours |
| I.V. | 84.4 |
| $N_{10}$ (UMA-unstab.) | 0.5 |
| $N_0$ | 8.3 |

This product was used with excellent results for spraying on to raisins at ambient temperature.

EXAMPLE II

To the product of Example I, an additional amount of 1430 ppm of tocopherols was added. The RIP (120° C.) of this product was 41.6 hours.

EXAMPLE III

A mixture of 50% soybean oil and 50% cottonseed oil was hardened (melting point 38° C.). The hardened mixture was wet-fractionated (acetone ratio 5 1/kg; T=0° C.).

A stearin fraction was separated from a solvent fraction (I). The solvent fraction (I) was cooled again, this time to −10° C. A new solid fraction was removed from a second solvent fraction. Evaporation of the solvent, followed by standard refining, led to an olein fraction yield 53%, with the following characteristics:

| | |
|---|---|
| Amount of $C_{18:3}$ | 0.1 wt. % |
| Amount of $C_{18:2}$ | 6 wt. % |
| Fe | 0.1 ppm |
| Cu | 0.02 ppm |
| Ni | 0.1 ppm |
| Tocopherols | 1741 ppm |
| RIP (120° C.) | 40.9 hours |
| I.V. | 84.6 |
| $N_{10}$ (UMA, unstab.) | 0.5 |
| $N_0$ | 4 |

EXAMPLE IV

The refined olein fraction of a wet fractionation of a hardened mixture of soybean oil and cottonseed oil (50:50) was dry-fractionated at 10° C. An olein fraction yield 55% was obtained that displayed the following characteristics:

| | |
|---|---|
| Amount of $C_{18:3}$ | 0.1 wt. % |
| Amount of $C_{18:2}$ | 8.0 wt. % |
| Fe | 0.2 ppm |
| Cu | 0.02 ppm |
| Ni | 0.05 ppm |
| Tocopherols | 1500 ppm |
| RIP (120° C.) | 36 hours |
| I.V. | 83.6 |
| $N_{10}$ (UMA, unstab.) | 0 |
| $N_0$ | 2.4 |

A wet fractionation with acetone at −10° C. led to a similar result.

EXAMPLE V

Example IV was repeated, but now the refined olein fraction of a wet fractionation of a hardened mixture of 30% soybean oil and 70% cottonseed oil was used. The product yield 60% displayed the following characteristics:

| | |
|---|---|
| Amount of $C_{18:3}$ | 0.1 wt. % |
| Amount of $C_{18:2}$ | 6.2 wt. % |
| Fe | 0.2 ppm |
| Cu | 0.02 ppm |
| Ni | 0.05 ppm |
| Tocopherols | 1250 ppm |
| RIP (120° C.) | 36.5 hours |
| I.V. | 81.2 |
| $N_{10}$ (UMA, unstab.) | 0 |
| $N_0$ | 1.8 |

What is claimed is:

1. High-stability oil comprising a vegetable, non-lauric triglyceride composition with a maximum amount of $C_{18:3}$ fatty acids of 1 wt. %, amount of $C_{18:2}$ fatty acids of 10 wt. %, while very small amount of Fe, Cu and Ni are present, which composition contains some amount of natural antioxidants, displays an N-profile (NMR, non-stabilized) of $N_{15}<10$, $N_{10}<5$ and $N_0<15$, and a RIP value of at 120° C. of at least 35 hours while its iodine value is at least 81, said oil being pumpable and sprayable without heating.

2. High-stability oil according to claim 1, wherein the RIP value is at least 40 hours at 120° C.

3. High-stability oil according to claim 2, wherein the amount of $C_{18:3}$ is less than 0.05 wt. % and the amount of $C_{18:2}$ is less than 5 wt. %.

4. High-stability oil according to claim 1, wherein at least 500 ppm, in particular at least 1000 ppm of natural tocopherols are present.

5. High-stability oil according to claim 1, wherein at most 0.2 ppm Fe, at most 0.04 ppm Cu and at most 0.2 ppm Ni are present.

6. High-stability oil according to claim 5, wherein less than 0.1 ppm Fe, less than 0.02 ppm Cu and less than 0.1 ppm Ni are present.

7. High-stability oil according to claim 1, wherein the colour change of the oil during storage at room temperature for 12 months is less than 0.1 Red in lov. 5¼" cell.

8. High-stability oil according to claim 1, wherein the taste after storage of the oil at room temperature for 6 months is unchanged.

9. High-stability oil according to claim 1, wherein the oil is the refined olein fraction of the dry or wet fractionation of an olein fraction of the wet fractionation of a hardened mixture of soybean oil and cottonseed oil.

10. High-stability oil according to claim 9, wherein the olein fraction used for the dry fractionation is obtained from a hardened mixture of soybean oil and cottonseed oil with a weight ratio of at least 1.0.

11. High-stability oil according to claim 9, wherein the olein fraction used for the dry fractionation is obtained from a hardened mixture of soybean oil and cottonseed oil in a weight ratio of less than 1.0.

12. High-stability oil according to claim 1, wherein the oil is the olein fraction of a fractionation of hardened soybean oil, hardened rapeseed oil or mixtures thereof.

13. High-stability oil comprising a vegetable, non-lauric triglyceride composition with a maximum amount of $C_{18:3}$ fatty acids of 1 wt. %, a maximum amount of $C_{18:2}$ fatty acids of 10 wt. %, while very small amounts of Fe, Cu and Ni are present, which composition contains some amount of natural antioxidants, displays an N-profile (NMR, non-stabilized) of $N_{15}<10$, $N_{10}<0.5$ and $N_0<5$, and a RIP value at 120° C. of at least 35 hours while its iodine value is at least 81.

14. High-stability oil comprising a vegetable, non-lauric triglyceride composition with an amount of $C_{18:3}$ fatty acids of less than 0.5 wt. %, an amount of $C_{18:2}$ fatty acids of less than 8 wt. %, while very small amounts of Fe, Cu and Ni are present, which composition contains some amount of natural antioxidants, displays an N-profile (NMR, non-stabilized) of $N_{15}<10$, $N_{10}<5$ and $N_0<15$ and a RIP value at 120° C. of at least 35 hours while its iodine value is at least 81.

15. High-stability oil comprising a vegetable, non-lauric triglyceride composition with a maximum amount of $C_{18:3}$ fatty acids of 1 wt. %, a maximum amount of $C_{18:2}$ fatty acids of 10 wt. %, while very small amounts of Fe, Cu and Ni are present, which composition contains some amount of natural antioxidants, displays an N-profile (NMR, non-stabilized) of $N_{15}<10$, $N_{10}<5$ and $N_0<15$, and a RIP value at 120° C. of at least 35 hours while its iodine value is at 82–95.

* * * * *

UNITED STATES PATENT AND TRADEMARK OFFICE
CERTIFICATE OF CORRECTION

PATENT NO.    : 5,393,906

DATED         : February 28, 1995

INVENTOR(S)   : Price et al.

It is certified that error appears in the above-identified patent and that said Letters Patent is hereby corrected as shown below:

Claim 1, Col. 4, line 36, following "1 wt. %," insert --a maximum--.

Signed and Sealed this

First Day of August, 1995

Attest:

BRUCE LEHMAN

Attesting Officer

Commissioner of Patents and Trademarks